(No Model.)
T. A. EDISON.
SYSTEM OF ELECTRICAL DISTRIBUTION.
No. 380,102. Patented Mar. 27, 1888.
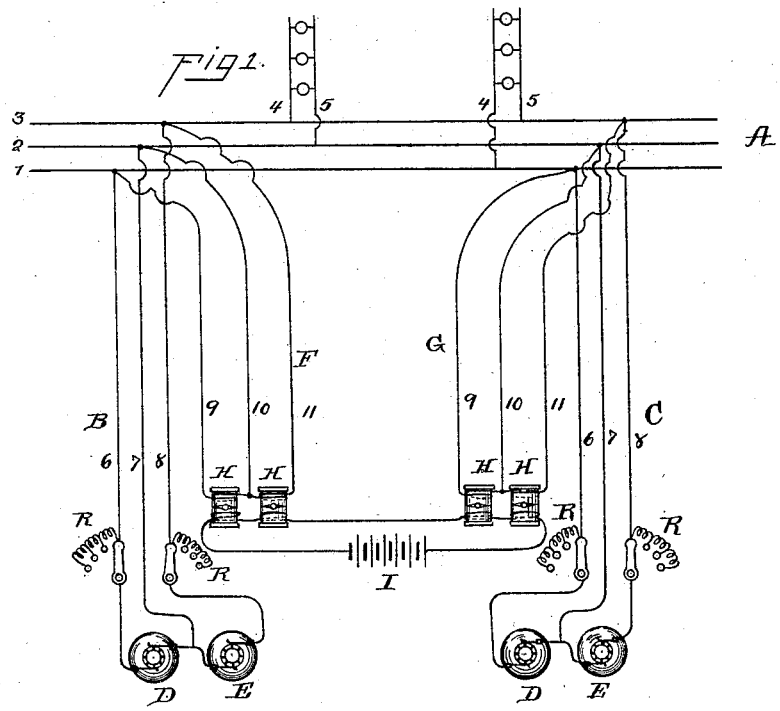

United States Patent Office.

THOMAS A. EDISON, OF LLEWELLYN PARK, NEW JERSEY.

SYSTEM OF ELECTRICAL DISTRIBUTION.

SPECIFICATION forming part of Letters Patent No. 380,102, dated March 27, 1888.

Application filed September 23, 1887. Serial No. 250,477. (No model.)

*To all whom it may concern:*

Be it known that I, THOMAS A. EDISON, of Llewellyn Park, in the county of Essex and State of New Jersey, have invented a certain new and useful Improvement in Systems of Electrical Distribution, (Case No. 731,) of which the following is a specification.

The object I have in view is to accomplish the indication of pressures for a system of electrical distribution by means which will be accurate and not liable to get out of order. This I accomplish by opposing at an electrical indicating-instrument for each set of pressure-wires the energy upon such wires and the energy of a standard battery, so that the indicator will stand at zero when the pressure is normal, and will move in one direction or the other, according to whether the pressure varies above or below the normal. In carrying out my invention I may put one coil of a differentially-wound galvanometer in the circuit of each set of pressure-wires, while the reverse coils of the several galvanometers will be in the circuit of a standard battery; or I may use a small standard battery for each set of pressure-wires, it being located in a shunt around a fraction of a resistance in the circuit of such pressure-wires, the shunt including, also, a simple galvanometer, and the parts being so proportioned that the standard battery in the shunt will produce a balance in such shunt when the pressure at the ends of the particular feeder is normal.

In the accompanying drawings, forming a part hereof, Figure 1 is a diagram illustrating the preferred arrangement, and Fig. 2 a diagram of a modified arrangement.

A represents the mains of a system of electrical distribution composed of three conductors, 1 2 3. A three-wire or compensating system is shown; but it is evident that the invention is applicable to any multiple-arc system. The consumption-circuits are represented at 4 5. Two three-wire feeders, B C, are shown extending back to the station, each composed of three conductors, 6, 7, and 8, having connected therewith two dynamo-electric machines, D E. The outside conductors of each feeder are provided with adjustable resistances R. Two sets of pressure-wires, F G, extend back from the outer ends of the feeders to the station, each set of such wires being composed of three wires, 9, 10, and 11.

By the preferred arrangement, Fig. 1, differentially-wound galvanometers H are employed, two for each set of pressure-wires, and having each two separate windings or coils. One coil of a galvanometer is in circuit with two pressure-wires, as shown, while the other coils of the two or more galvanometers are in circuit with a standard battery, I, the current of which serves to oppose at the galvanometers the current flowing on the pressure-wires, bringing the needles to zero when the pressures at the ends of the feeders are normal.

By the modified arrangement, Fig. 2, a fixed resistance, $r$, is located in circuit with each pair of pressure-wires, and a shunt, 12 13, is taken around a portion of the resistance, the shunt including a standard battery, $i$, and a simple galvanometer, $h$. The parts are proportioned so that the standard battery in each shunt will balance the electro-motive force at the shunt-terminals under normal conditions. In the case of either arrangement, when one of the galvanometer-needles moves, it is an indication that the pressure at the end of the particular feeder and on the particular side of the system is above or below the normal. By adjusting the proper resistance R the normal conditions will be restored. By this means of indication the accuracy of the result is not dependent upon the delicacy of the indicating apparatus, which may have a deflection of several inches for one volt; hence friction and other defects which render ordinary indicating apparatus liable to give incorrect readings, owing, principally, to the necessity for great delicacy, are obviated. As all indicating apparatus is originally standardized by a battery, it follows that a properly-constructed battery is the best possible means for securing constant pressures in a station for a long period of time.

The battery I prefer to use is the ordinary gravity battery with moderately-pure zinc and sulphate of copper; but of course I do not desire to limit my invention to the use of any particular battery.

What I claim is—

1. In a system of electrical distribution, the combination, with a set of pressure-wires, of an electrically-moved indicator connected with such pressure-wires, and a standard battery, also connected with such indicator and opposing the effect of the system pressure at such indicator, substantially as set forth.

2. In a system of electrical distribution, the combination, with two or more sets of pressure-wires, of a double-wound electrically-moved indicator for each set of pressure-wires and connected by one winding with such pressure-wires, and a standard battery connected with the other windings of the two or more indicators and opposing at such indicators the energy of the system, substantially as set forth.

3. In a system of electrical distribution, the combination, with a feeder having means for varying the pressure at its outer end, and a set of pressure-wires extending from the outer end of the feeder back to the station, of an electrically-moved indicator connected with such pressure-wires, and a standard battery, also connected with such indicator and opposing the effect of the system pressure at such indicator, substantially as set forth.

4. In a system of electrical distribution, the combination, with two or more feeders having means for varying the pressure at their outer ends, and a set of pressure-wires extending from the outer end of each feeder back to the station, of a double-wound electrically-moved indicator for each set of pressure-wires and connected by one winding with such pressure-wires, and a standard battery connected with the other windings of the two or more indicators and opposing at such indicators the energy of the system, substantially as set forth.

This specification signed and witnessed this 14th day of September, 1887.

THOS. A. EDISON.

Witnesses:
WILLIAM PELZER,
E. C. ROWLAND.